(No Model.) 2 Sheets—Sheet 1.

J. W. CULMER.
GAS METER.

No. 398,707. Patented Feb. 26, 1889.

Witnesses:
E. G. Walker
O. L. Moulton.

Inventor
John W. Culmer
by F. W. Ritter Jr.
atty (No Model.) 2 Sheets—Sheet 2.
J. W. CULMER.
GAS METER.
No. 398,707. Patented Feb. 26, 1889.
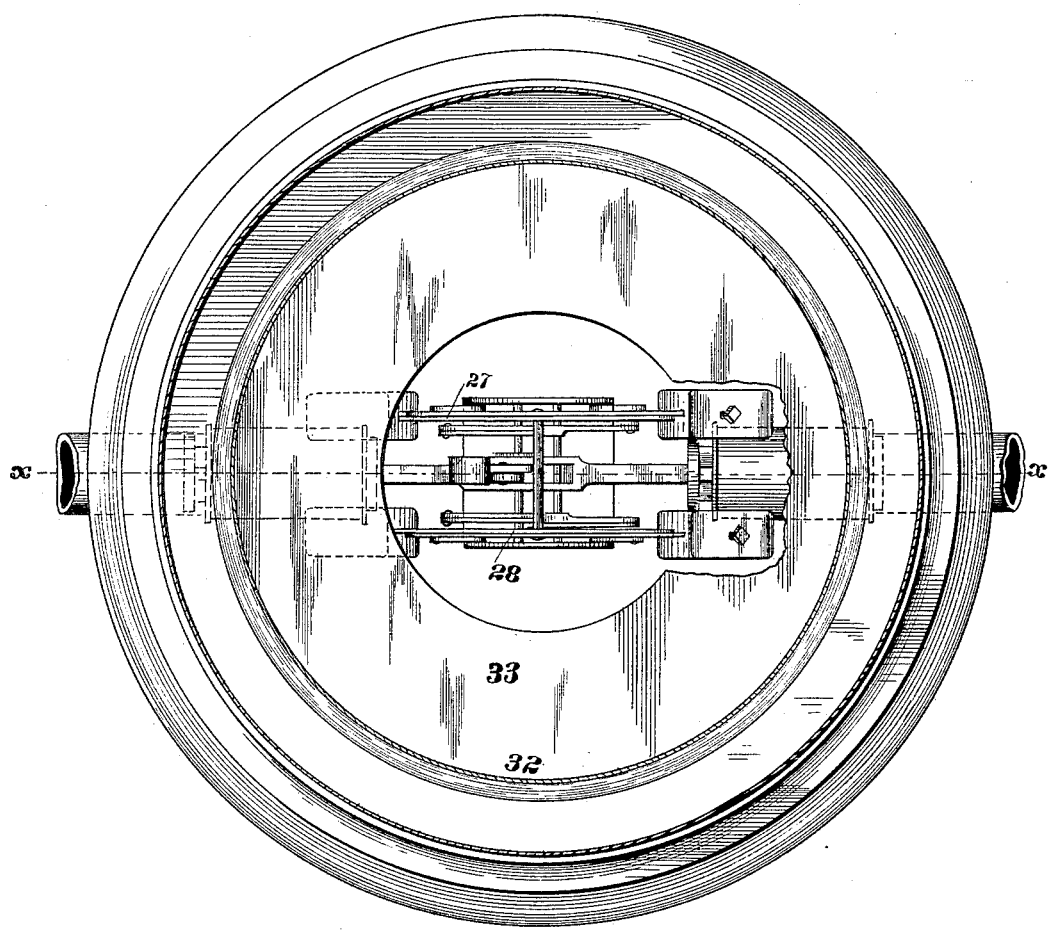
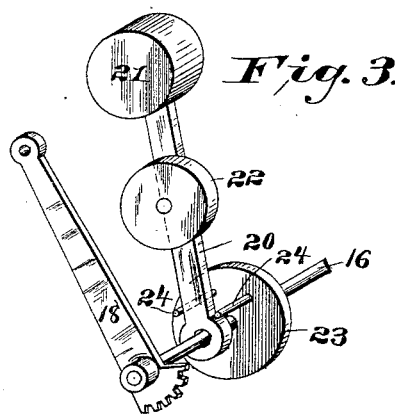
Witnesses:
Inventor.
John W. Culmer

UNITED STATES PATENT OFFICE.

JOHN W. CULMER, OF NEW BRIGHTON, PENNSYLVANIA, ASSIGNOR TO JOHN H. LOGAN, OF SAME PLACE.

GAS-METER.

SPECIFICATION forming part of Letters Patent No. 398,707, dated February 26, 1889.

Application filed August 29, 1888. Serial No. 284,075. (No model.)

*To all whom it may concern:*

Be it known that I, JOHN W. CULMER, a citizen of the United States, residing at the borough of New Brighton, in the county of Beaver and State of Pennsylvania, have invented certain new and useful Improvements in Gas-Meters; and I hereby declare the following to be a full, clear, and exact description of the same, reference being had to the accompanying drawings, in which—

Figure 1:
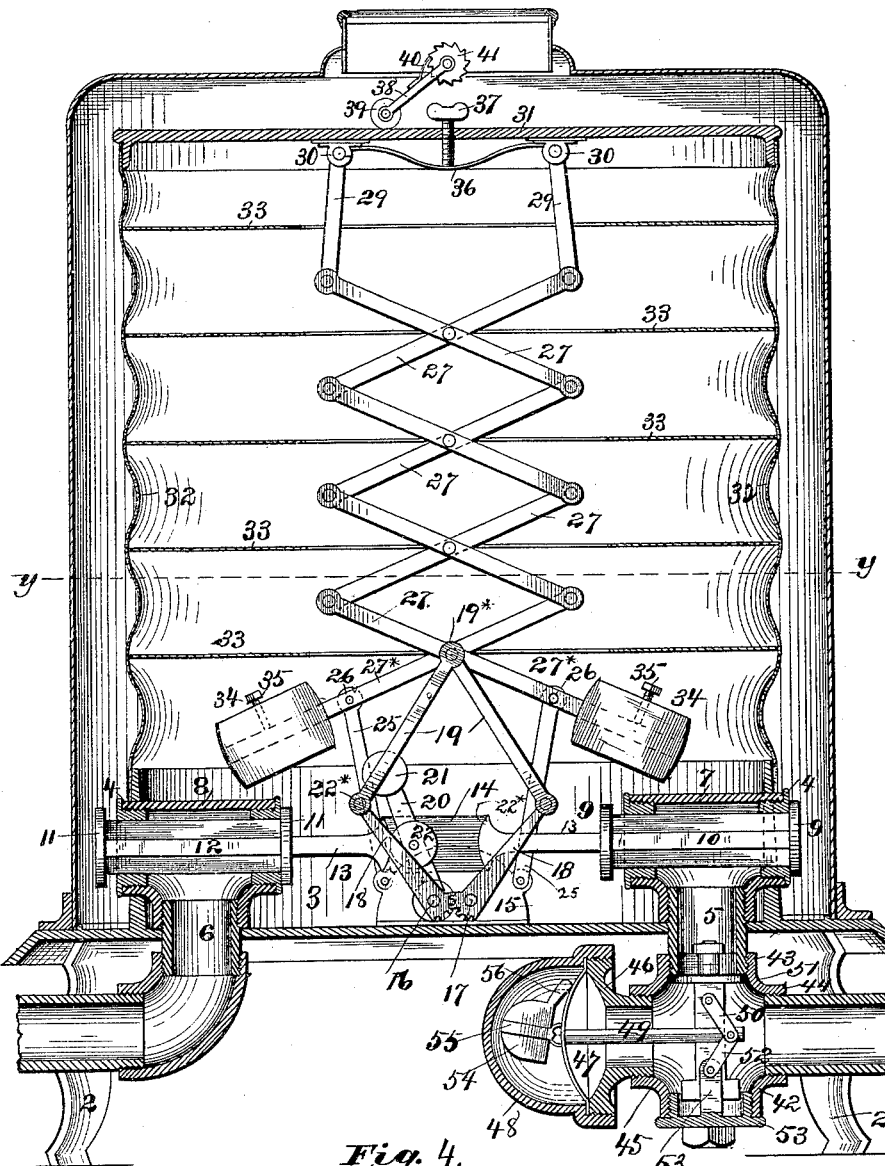
Figure 4:
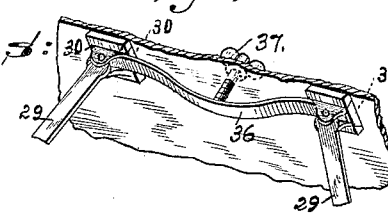

Figure 1 is a vertical section of a gas-meter embodying my invention on the line *x x*, Fig. 2. Fig. 2 is a horizontal or transverse section on the line *y y*, Fig. 1, a portion of one of the bellows-rings being broken away to show the weights which counterbalance the piston and bellows. Fig. 3 is a detail view of the mechanism for suddenly throwing or moving the meter-valves. Fig. 4 is a detail perspective view of a portion of the bellows-piston and one set of levers, 29, which connect the lazy-tongs with said piston, showing the slides 30, bent plate 36, which connects the same, and the guideways of the slide.

Like figures refer to like parts wherever they occur.

My invention relates to that class of "dry meters" wherein the measurement is effected by the reciprocating action of a piston inclosed within an outer case of cylindrical or other appropriate form.

Heretofore, so far as I am aware, this class of meters has been constructed with pistons attached to bellows of rubber, leather, or other suitable flexible material, the bellows being attached to the piston and to a base by gas-tight joints, the space inclosed within the bellows between its points of greatest expansion and contraction furnishing the unit of measure. In this class of meters, as a rule, two or more such bellows with their piston-heads and attachments are made complementary to each other, the action of one operating the valves and controlling the inflow and exhaust of the other or others; or two bellows are complementary to each other, in that they are attached by means of levers or bell-cranks to the same spindle which they rotate, and which in turn operates the valve of each bellows at fixed relative points of their strokes. As the motion of the valve-gear in such meters is comparatively slow, and as (to be accurate) the ports must be opened and closed at a fixed point near or at the ends of the stroke, the valves are necessarily some form of the slide-valve type. The motion due to the rotation of the spindle which actuates the valve-gear is continuous through the entire stroke of the piston or bellows. Therefore the contact-surfaces of the valves and port-plates are necessarily large in comparison with the ports. Consequently there is considerable friction, and this friction is increased as the gummy or waxy precipitate from the gas is deposited upon the sliding surfaces. Furthermore, in this class of meters, as commonly constructed, where two or more bellows are used they are separated by a gas-tight diaphragm of sheet metal or other material, and to avoid the weight of the bellows and the pistons and guides which they support the diaphragm is placed vertically within the outer case, and the stroke of the pistons is on a horizontal line at right angles with the diaphragm. The space surrounding the bellows within the case is not utilized. The stroke of the piston is limited by the necessity of using its guides as the primary levers of the bell-crank or rotary valve system, and there is no method of adjustment to obtain accuracy of measurement.

Under some conditions it is necessary to use a meter in which a single bellows operates in a vertical line upon a horizontal base, the top of the bellows forming a piston which plunges upward into the space inclosed within the outer case. In such cases the weight of the bellows and all its attachments retards the upward movement and compresses the gas, while the downward stroke is accelerated by the weight, and the result is an intermittent outflow of the gas, which is very objectionable.

The object of my present invention is to obviate the several objections above recited; and to this end it consists, first, in utilizing the entire space within the outer case of the apparatus; second, in providing a mechanism which shall have a parallel motion, so as to maintain the piston and bellows at a proper distance from the outer case; third, in providing means for lengthening or shortening the stroke of the piston, so as to obtain a ready adjustment for correcting errors in measurement; fourth, in providing an adjustable counterbalance which shall equalize the weight of the piston and its attachments, so that there shall be no compression of the gas necessary to the operation of the meter; and, finally, in special details of construction, all as will hereinafter more fully appear.

For the purposes of this specification I have elected to show my invention as applied to an upright single-piston meter of the class specified, but do not desire or intend to be limited thereby, as the majority of the features of invention are equally applicable to meters having two or more pistons and bellows, as will be readily apparent to those skilled in the art.

I will now proceed to describe my invention more specifically, so that others skilled in the art to which it appertains may apply the same.

1 indicates the base of a single-piston upright meter supported on feet 2, and provided with a ring, 3, which rises to a sufficient height to admit of passages or ports 4 therethrough. This ring 3 forms a portion of the dividing-wall of the inner or bellows chamber and an outer or case chamber.

Through the base 1 at suitable points are formed the inlet-passage 5 and the outlet-passage 6, each of which terminates above the base 1 in a T-tube, 7 and 8, having one opening outside the ring 3 and one opening inside of said ring, the several openings being in line or otherwise suitably arranged to permit of the coupling of the valves. The openings of the T's 7 and 8 form valve-seats, and may have suitable bushings, if desired.

9 9 indicate a double puppet or equivalent inlet valve, of a character to seat squarely and directly without sliding, rotation, or material friction, preferably provided with wing-guides 10, and 11 11 indicate a similar outlet-valve having wing-guides 12, the said valves 9 9 and 11 11 being connected by a stem, 13, having a central slot or mortise, 14, for the admission of a roller, 22. The valves are so adjusted on the stem that when the stem is thrown in one direction the outer port of the inlet-passage 5 and the inner port of the outlet-passage 6 shall be opened, and vice versa, the valves closing down upon the ports squarely and being supported by the wing-guides 10 and 12 within the passages of the T-tubes.

Secured to the base 1 is a stand, 15, in which are journaled the spindles 16 and 17, and secured to said spindles are levers 18 18, having their engaged ends constructed in the form of quadrant-gear and meshing with each other, while their opposite ends are connected by pivoted rods or links 19 with a lazy-tongs mechanism, which is in turn connected with the piston, so that the movement of the piston is communicated to the spindles 16 and 17.

Upon the spindle 16 is loosely fitted a lever, 20, provided at its extremity with a weight, 21, and about midway of its length with a roller, 22, and said lever 20 passes through the central slot, 14, of stem 13, which connects the valves. Secured to said spindle 16, so as to rotate therewith, is a disk, 23, (see Fig. 3,) provided with pins 24, which pass upon either side of lever 20 and are at such distance apart as to allow a certain amount of play or throw to the lever 20 whenever it is struck and thrown by either of the pins 24.

Upon stand 15 are rods 25, which support by means of pivot-pins 26 two pairs of lazy-tongs, 27 and 28, arranged parallel (see Fig. 2) and connected at one end by pin 19*, links or rods 19, and levers 18 with spindles 16 and 17, and at the other end by levers 29 and pivot-blocks 30 with piston 31. The pivot-blocks 30 are sliding blocks arranged in guideways 30*, said blocks being connected by a strap or plate, 36, controlled by a screw, 37, which passes through the piston 31. (See Fig. 4.)

The piston 31 may be of any suitable or approved material, and is connected with the base-ring 3 by means of the bellows 32, which bellows is provided with the rings 33 and incloses the mechanism hereinbefore described, said bellows having a gas-tight joint where it is connected with the piston 31 and the ring 3.

In order to counterbalance the weight of the piston 31, bellows 32, and their adjuncts in upright meters, the lower members, 27*, of the lazy-tongs are extended (see Fig. 1) and provided with sliding weights 34, having set-screws 35, by means of which the said weights may be secured after having been properly adjusted.

In order to lengthen or shorten the stroke of piston 31 or adjust the same, so as to correct any errors in measurement, the two levers 29 or the sliding pivot-blocks 30 thereof are connected by means of a bent plate, 36, (or its equivalent,) and provided with a set-screw, 37, which passes through the piston 31. The drawing down of the plate 36 by means of screw 37 shortens the arc through which the levers 29 can travel and proportionally shortens the stroke of the piston.

38 indicates a swinging lever provided with an anti-friction roller, 39, and a pawl, 40, which lever stands in the path of the piston 31, so as to be struck thereby and operate any suitable registering mechanism, (indicated by the ratchet-wheels 41.)

Where the supply of gas is received from a high-pressure main, or, in the use of "natural gas," where the mains are subject to great fluctuations of pressure, it is desirable to protect the meter from the effects of said excessive or fluctuating pressure, for which purpose I combine with the meter a regulator, as shown in Fig. 1: For said purpose I provide a cross-shaped tubular fitting, 42, and connect the same by one arm or branch, 43, to the inlet-pipe 5 of the meter and by another branch, 44, with the supply-pipe leading from the main. In a third branch, 45, I fit the male screw-disk 46, dished or concaved to permit the movement of a flexible diaphragm, 47, which diaphragm I cover and secure in place by means of a gas-tight dome, 48. Attached to the diaphragm 47 and extending back therefrom in line with the center of the supply-pipe is a stem, 49, connected by means of one link or short lever, 50, with the stem of a valve, 51, arranged to seat on the port of inlet-pipe 5 of the meter, and also connected by a second link or short lever, 52, with a plug, 53, which closes the fourth branch of the cross-shaped fitting, or that opposite the inlet-pipe 5 of the meter. The cup of plug 53 may form the guide for the stem of valve 51, as shown in the drawings.

Within the chamber formed by the dome 48 and the diaphragm 47, I suspend a movable weight, 54, by means of a stem, 55, and lever 56, so that it shall bear against the stem 49 of diaphragm 47 and weight the diaphragm against the pressure of the inflowing gas. By a proper adjustment of said weight the diaphragm 47 can be held in its normal position in the concavity or dish of the male threaded disk 46 under any predetermined pressure of inflowing gas, in which condition the valve 51, which guards the inlet-pipe 5 of the meter, will be off its seat; but as soon as the pressure of the inflowing gas exceeds that for which the weight is adjusted the diaphragm 47 will assume the position shown in Fig. 1, and in so doing the movement of stem 49 will, through links or levers 50 and 52, force the valve 51 on its seat and close the inlet-pipe 5 of the meter and obviate all danger of bursting the meter, bellows, or case.

The meter being constructed substantially as hereinbefore described will operate as follows: Gas from the supply-pipe being admitted through inlet 5, the valves being in the position shown in Fig. 1, will pass into the interior of the bellows and raise the piston 31 until the extension of lazy-tongs 27 and 28 has raised the pin 19* and links or levers 19, so as to rotate the spindle 16 by means of the geared levers 18 to a point where the pin 24 on disk 23 has carried lever 20 past its center, whereupon the weight 21 will cause it to fall, and the roller 22, being brought in sudden contact with strike 22*, (or one end of the slot 14 in lever 13,) will instantly reverse the valves, so that the gas will flow through the inlet-port (at the right of Fig. 1) outside the ring 3, and the gas contained within the bellows will flow out through the outlet-port (on left of Fig. 1) inside the ring 3. Thus the gas will be measured by displacement. The parallel lazy-tongs movement 27 and 28 will maintain the proper relation of bellows and outer case. The strap and set-screw mechanism 36 37, combined with the lazy-tongs, will afford ready means for adjusting the movement of the bellows and correcting errors in measurement, the counter-weights 34, combined with the lazy-tongs, will neutralize the weight of the piston and bellows, and the valve-throwing mechanism 13, 14, 20, 21, 23, and 24 will, together with the form of valve employed, insure an instantaneous opening and closing (or shifting) of the valves without material friction or loss of time or power, securing all of the several advantages and obviating all the disadvantages hereinbefore set forth.

I am aware that plungers displacing fluids by their introduction into free space have been heretofore used, and that bellows and lazy-tongs movements are old, as well as two or more valves upon one stem operating in a right line, and do not herein broadly claim the same. Neither do I herein claim the combination, with an outer shell or case, of a bellows-ring provided with valved passages which connect with both the interior and exterior of the bellows-ring, said bellows-ring detached and arranged concentrically with the shell or case to afford attachment for a series of bellows within a common case, as the same forms the subject-matter of a separate application, Serial No. 284,076, filed of even date herewith; but,

Having thus described my invention, what I claim, and desire to secure by Letters Patent, is—

1. In a single-piston meter, the combination, with an outer case or shell and a piston and its bellows, of a meter-base ring having an annular flange for the attachment of the bellows, said flange provided with valve-ports and arranged to form a portion of the wall which divides the inner or bellows chamber from the outer or shell chamber, substantially as and for the purposes specified.

2. In a gas-meter, the combination, with a bellows and its piston and base, of parallel lazy-tongs mechanism, substantially as and for the purposes specified.

3. In a gas-meter, the combination, with a bellows and its piston, of a lazy-tongs and counter-weights, substantially as and for the purposes specified.

4. In a gas-meter, the combination of a bellows and its piston, with a lazy-tongs mechanism, and with interposed adjustable pivot-blocks which connect the lazy-tongs levers with the piston-head, substantially as and for the purposes specified.

5. In a gas-meter, the combination, with a bellows and its piston, of a lazy-tongs, plate 36, slides 30, and set-screw 37, substantially as and for the purposes specified.

6. In a gas-meter, the combination, with the bellows and its piston, of a lazy-tongs mechanism having adjustable connections with said piston, a spindle actuated thereby, a weighted drop-lever tripped or actuated by the spindle, and a valve arranged to be shifted by the fall of the drop-lever, substantially as and for the purposes specified.

7. In a gas-meter, the combination, with a bellows, of a lazy-tongs, geared levers operated thereby, a spindle operated by the geared levers, a weighted lever loose on the spindle, a disk secured to the spindle and having pins which straddle the weighted lever, and a valve actuated by the weighted lever, substantially as and for the purposes specified.

8. In a gas-meter, the combination of a base, a piston, a bellows which connects the base and piston, a lazy-tongs movement, and adjustable weights arranged on the lower members of the lazy-tongs, substantially as and for the purposes specified.

9. In a gas-meter, the combination of an inner and an outer meter or measuring-chamber, T-inlet and T-outlets which extend between the inner to the outer chambers, double puppet-valves therefor, a stem which connects the double puppet inlet-valve and the double puppet outlet-valves, and mechanism for actuating the valve-stem, substantially as and for the purposes specified.

10. In a gas-meter, the combination of an outer shell, an inclosed piston and bellows forming two chambers, inlet-ports and outlet-ports extending between the same, a double puppet inlet-valve, a double puppet outlet-valve, a slotted valve-stem which connects the two double puppet-valves, and is provided with strikes, a pivoted weighted drop or gravity lever, and lazy-tongs mechanism for actuating the drop or gravity lever from the bellows, substantially as and for the purposes specified.

In testimony whereof I affix my signature, in presence of two witnesses, this 27th day of August, 1888.

JOHN W. CULMER.

Witnesses:
   W. A. COVENTRY,
   JOSEPH SWESEY,